Oct. 29, 1940. H. F. MAYNES 2,220,017
FISHING REEL
Filed Feb. 4, 1939 3 Sheets-Sheet 1
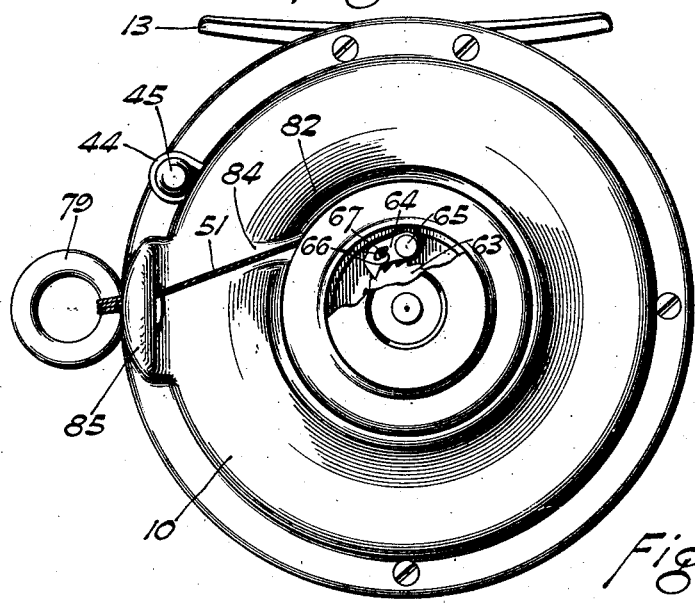
Fig. 1.
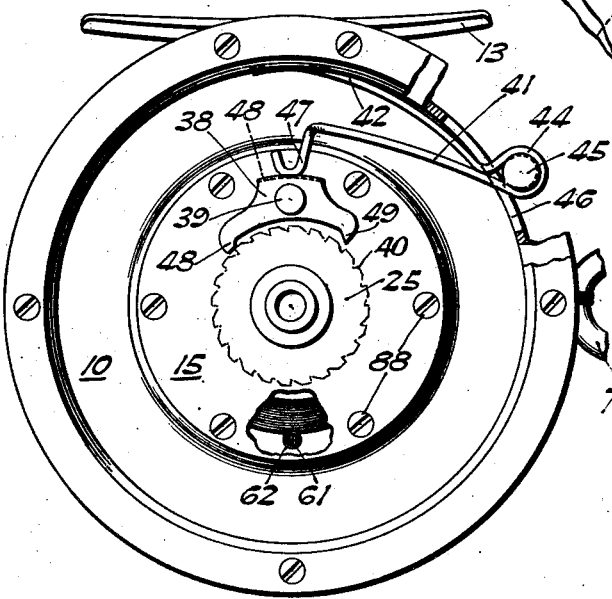
Fig. 2.
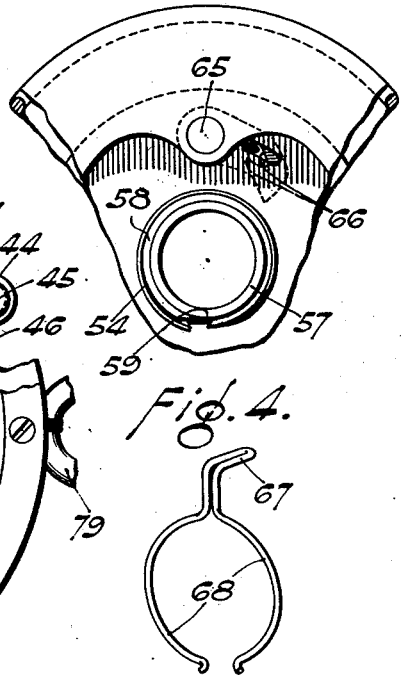
Fig. 3.
Fig. 4.
INVENTOR
HYLA F. MAYNES
BY
Beau, Brooks, Buckley & Beau.
ATTORNEYS Oct. 29, 1940.   H. F. MAYNES   2,220,017
FISHING REEL
Filed Feb. 4, 1939   3 Sheets-Sheet 2
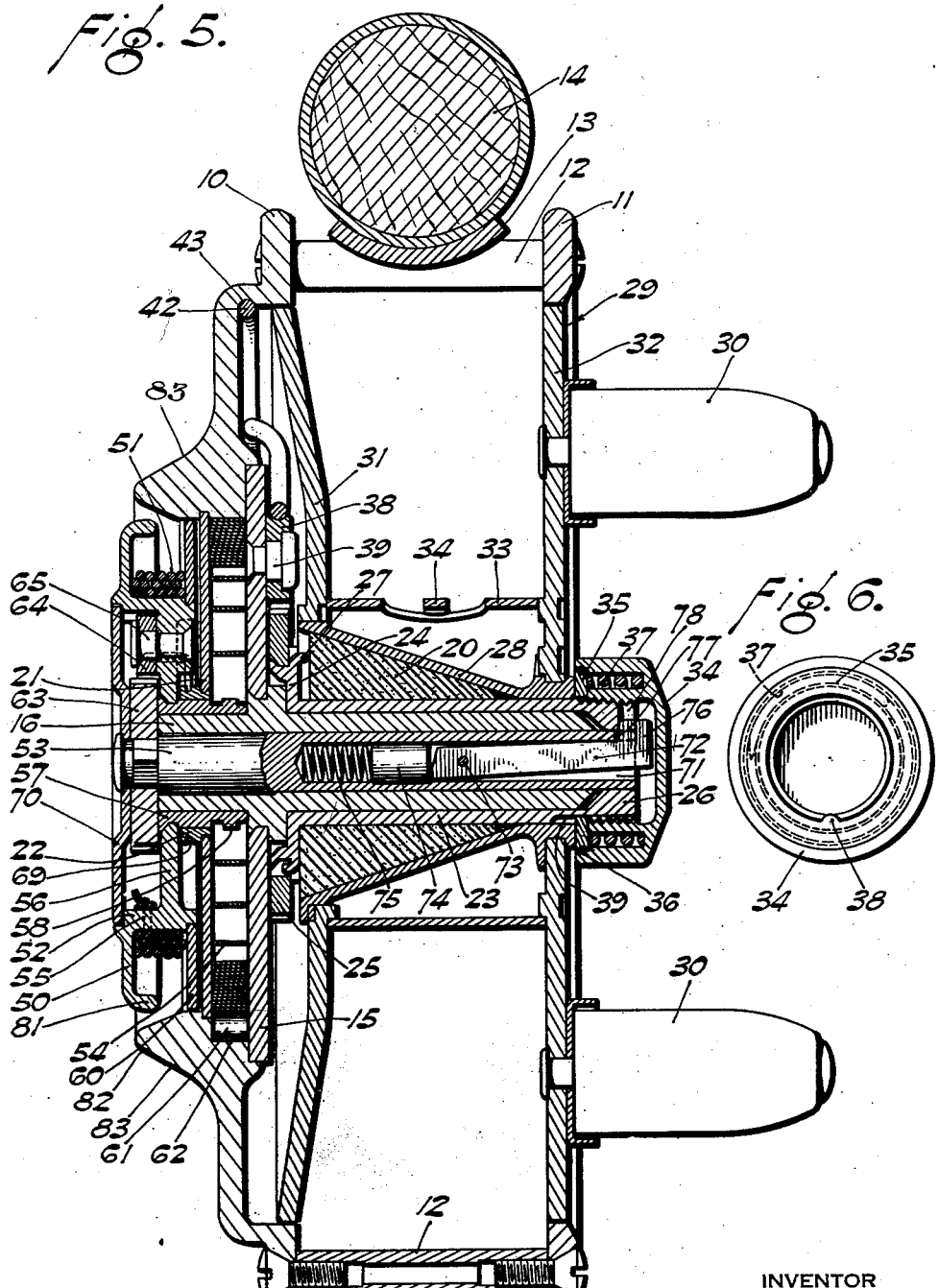
INVENTOR
HYLA F. MAYNES
BY
Beau, Brooks, Buckley & Beau.
ATTORNEYS

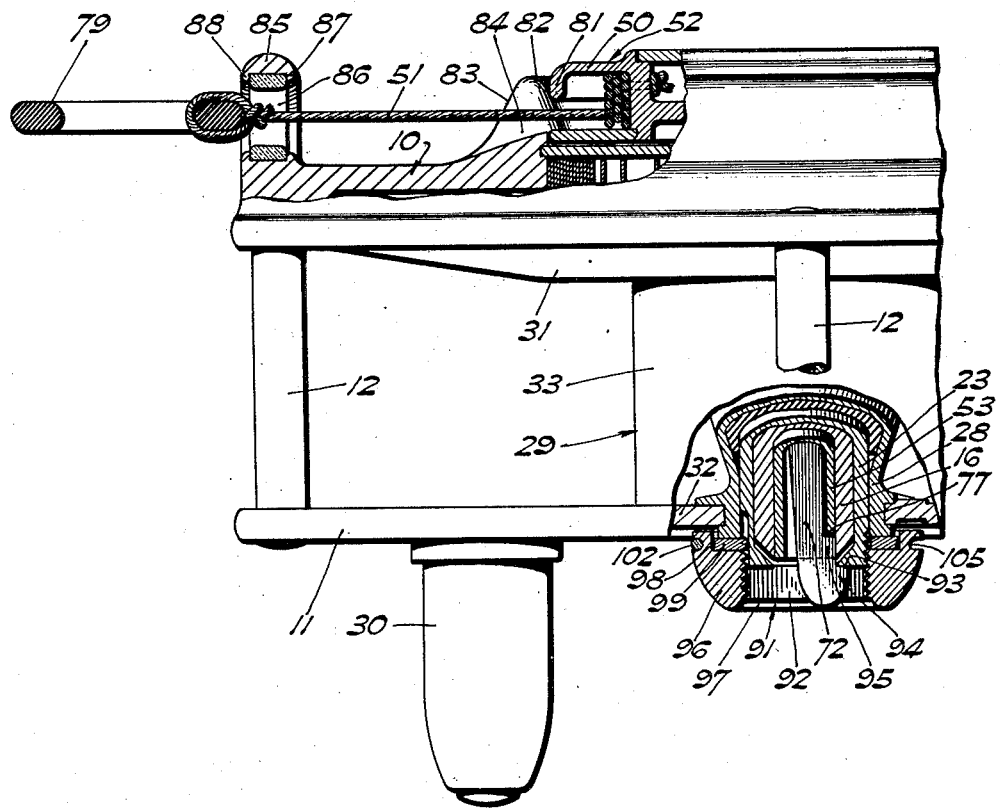
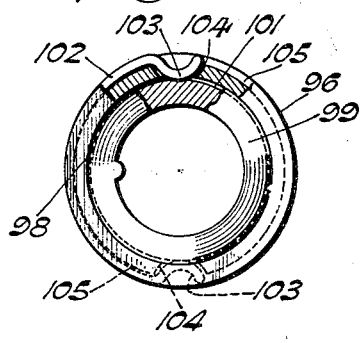
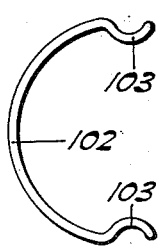
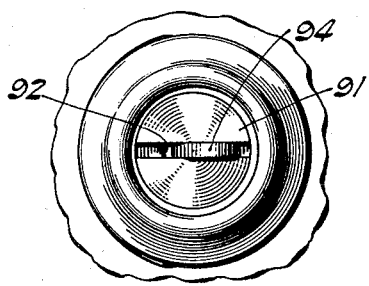

Patented Oct. 29, 1940

2,220,017

UNITED STATES PATENT OFFICE 2,220,017

FISHING REEL

Hyla F. Maynes, North Tonawanda, N. Y., assignor of one-half to Emma C. Maynes, North Tonawanda, N. Y.

Application February 4, 1939, Serial No. 254,736

21 Claims. (Cl. 242—84.3)

This invention relates to a fishing reel and it has particular relation to the structure and arrangement of a so-called trout reel, although its use is not limited to any particular method of casting.

The invention is related to, and constitutes improvement over, the reel structures described and claimed in my Patents, No. 2,130,670 and No. 2,130,671, both granted on September 20, 1938.

According to the present invention, a reel structure is provided which possesses the general characteristics of the reels described in my aforementioned patents, including a drive for the spool of the reel consisting of a pulley rotated in one direction by a pull cord and in the opposite direction by a spring, and a ratchet or one-way drive between the pulley and the spool; and further including a spool structure having relatively rotatable hub parts whose relative motion is controlled by a clutch and braking mechanism.

The present invention provides an improved arrangement and design of parts whereby the latter may be produced economically without requiring unusual, complex, or expensive machinery operations, and whereby the parts are capable of assembly and disassembly with great facility.

The parts, arranged in units detachable as such, are held in assembly by locking or latching means, so arranged that an intentional operation is required for removal of each unit from the composite structure. By this arrangement parts will not become accidentally displaced, and perhaps lost, incident to intentional removal of another part.

Further, according to the present invention, the face of the reel upon which the pulley is mounted is provided with means to deflect from possible accidental engagement with the pulley, a fishing line or the like which may pass over the face during casting or other fishing operations.

One object of the invention is to provide a fishing reel which has advantages of construction and operation superior to those previously known types of automatic trout reels and in which disadvantages of such previously known reels are obviated.

Another object of the invention is to provide an improved braking and clutch control assembly.

Another object of the invention is to provide an improved pulley-operated ratchet drive mechanism for the reel, wherein the parts are of simple and durable construction.

Another object of the invention is to provide improved arrangements of disengageable structural elements for facilitating assembling and disassembling of the parts of the fishing reel.

Another object of the invention is to provide improved relationship of parts so designed that detachment of one unit will not serve to detach other units, and wherein an intentional operation must be performed to detach each part.

Another object of the invention is to provide an improved side face structure for the reel, to deflect a fishing line or the like and prevent it from becoming entangled with the reel.

These and other objects and advantages of the present invention will become apparent from the following description of the typical embodiment illustrated in the accompanying drawings, wherein:

Fig. 1 is a side elevational view of a fishing reel with a cover plate partially broken away to reveal interior structure;

Fig. 2 is an elevational view of the opposite side of the reel with parts thereof broken away, and with the spool and certain other parts removed therefrom;

Fig. 3 is a fragmentary elevation, viewed from the same direction as Fig. 2, with certain parts of the reel frame shown in the latter view removed;

Fig. 4 is a perspective view of a pawl actuating member associated with the ratchet mechanism shown in Figs. 1 and 3;

Fig. 5 is a vertical sectional view of the reel in the plane of the axis of the spool;

Fig. 6 is an end view of the brake or slip clutch control assembly;

Fig. 7 is a fragmentary bottom view of the reel with a modified brake or clutch control assembly, parts of the structure being broken away in the view;

Fig. 8 is an elevational view of the inner end of the control unit illustrated in Fig. 7;

Fig. 9 is a fragmentary elevational view of the reel, the outer end of the control unit of Fig. 8 appearing in elevation; and Fig. 10 is an elevational view of a spring employed in the unit shown in Figs. 8 and 9.

As shown in the drawings, the reel has a frame 10 to which a ring 11 is connected in spaced relation by suitable fasteners cooperating with posts 12. A saddle 13 joined to upper posts 12 may be secured to a casting rod 14 in any suitable manner, not shown. Stationary with respect to frame 10 is a side plate 15 which supports a sleeve 16. Also fixed to the frame 10, and disposed in parallel relation to side plate 15, is a disc 21 having an annulus 22 secured centrally thereof in concentric relation to sleeve 16.

Rotatable upon sleeve 16 is an inner hub 23 having at one end an outwardly directed flange 24 carrying a ratchet wheel 25, and having at its other end an inwardly directed flange 26. Adjacent flange 24, and held against rotation on hub 23 by fingers 27 extending from the flange, is a brake drum 20 whose outer, conical face is frictionally engageable with the inner face of an outer hub 28. The latter is rotatable upon the inner hub 23, and constitutes the inner part of the spool 29 which has flanges 31, 32 and a drum 33. The drum is provided with suitable means, indicated at 34, for anchoring a line which is to be wound upon the spool 29. Crank handles 30 may be affixed to flange 32 of the spool in any suitable manner.

For controlling the braking or slip clutch effect of drum 20 upon outer hub 28, the assembly shown in Fig. 6 is provided. It consists of a cap 34 threaded upon inner hub 23, a washer 35 rotatably secured to the cap by a locking ring 36, and a helical spring 37 disposed in an annular recess in the cap and compressed between the cap and washer 35. The latter has a key 38 formed thereon for engagement in a keyway 39 formed in inner hub 23.

By this arrangement the outer hub 28 (and the spool 29 of which it is a part) may be moved axially, by turning screw threaded cap 34 in one direction, to frictionally engage drum 20 with the desired degree of braking pressure, or the cap may be turned in the opposite direction to decrease the braking or clutching effect. However, regardless of its adjustment the cap is at all times held frictionally against turning relative to washer 35 (and relative to inner sleeve 24 to which the washer is keyed), by pressure of spring 37.

For further controlling rotation of the spool 29, there is provided ratchet or clicker mechanism shown in Figs. 2 and 5, including the aforementioned ratchet wheel 25 on flange 24 of the inner hub 23. This mechanism consists of a double pawl 38, pivoted by pin 39 to stationary side plate 15 of the reel, and a spring 41 for controlling the pawl. The spring is adjustable, having a part 42 slidable along a groove 43 formed in frame member 10, and also having a bight portion 44 carrying a finger piece 45 which extends through a slot 46 in the frame member. An end portion 47 of the spring engages and is slidable along grooved surface 48 of the pawl.

By movement of the finger piece 45, end 47 of the spring may be caused to press upon the pawl directly above the pin 39 in which case the pawl is held from engagement with ratchet wheel 25, or may be caused to press upon the pawl on one or the other side of the pin, in which case either finger 48 or finger 49 of the pawl will be pressed into engagement with ratchet wheel 25. Finger 48 is so formed that when the spring presses it against ratchet wheel 25, the latter is free to rotate in either direction under a slight drag, the finger riding upon teeth 40 of ratchet wheel 25 causing a soft clicking sound. Finger 49 is so formed that when the spring presses it against the ratchet wheel 25, the latter is latched against rotation in one direction (against counterclockwise rotation as the parts appear in Fig. 2) but is permitted to rotate in the opposite direction, resisted by the pressure of spring 41 and accompanied by a pronounced clicking sound as finger 49 successively drops behind teeth 40.

It will be understood that the control member 34 will be operated as a brake control when the finger piece 45 is in forward position (when ratchet finger 49 is engaged with ratchet wheel 25) so that the inner hub 23 is held against rotation in the direction which unwinds spool 29. Otherwise the inner hub is permitted to rotate, allowing the spool to unwind regardless of the amount of braking effect between it and the inner hub.

For winding in line upon the spool 29, there is provided a pull cord 51, a pulley 52, a shaft 53, a spiral spring 54, one-way or ratchet drive means for connecting the pulley to the shaft, and means for connecting the shaft 53 to the inner hub member 23. The pulley 52 includes spaced flanges 50 and 60 between which pull cord 51 is wound about the pulley, the latter having an opening through which one end of the cord may be threaded and knotted as indicated at 55, and the pulley further includes a web 56 affixed to a pulley hub 57.

Hub 57 is journalled between the concentric outer and inner surface portions of stationary sleeve 16 and stationary annulus 22, and a portion thereof disposed between disc 21 and side wall 15 has an annular ridge 58 notched at 59 (as shown in Fig. 3) to anchor the inner end of the spring 54. The latter is disposed in the space between the stationary parts 21 and 15, and has its outer end formed into a small loop 61 which is anchored in a recess 62 formed in frame member 10.

Shaft 53 is journalled in sleeve 16 and the end thereof adjacent the pulley has affixed thereto a ratchet wheel 63 of the one-way or ratchet drive means. The latter means also includes a pawl 64 pivoted by pin 65 to web 56 of the pulley. An opening in the pawl has opposed cam surfaces 66 which are engageable by a finger portion 67 of the pawl actuating member shown in Fig 4. This member, formed of spring wire, has a loop portion 68 frictionally engaging the bottom wall of an annular groove 69 formed in the stationary member 22. For enclosing and protecting the ratchet drive mechanism, a cover plate 70 is secured to the end of shaft 53. In the device illustrated this has been accomplished by swaging over the end of the shaft, thereby securing both the plate 70 and ratchet wheel 63.

A bore 71 in shaft 53 contains a lever 72 which is pivoted therein by pin 73, and also contains a plunger 74 backed by compressed spring 75. The plunger presses against an inner end portion of the lever which is offset from the axis of the pin, thereby urging the lever about the latter in a counterclockwise direction as the parts appear in Fig. 5. A projection 76 from the outer end of the lever engages in notches 77 and 78 formed respectively in the ends of shaft 53 and inner hub 23, keying these parts together.

In normal operation it will be understood that line wound upon spool 29 may be reeled in or out by turning crank handles 30, but usually the fisherman will hold the rod in his right hand, and will pay out line with his left hand.

Line may be reeled in with the left hand by alternately drawing out cord 51 and allowing it to be rewound upon pulley 52. For this purpose the end of the cord is preferably provided with a ring 79 or other easily gripped finger hold. As the cord is drawn out the pulley 52 is rotated (counterclockwise as viewed in Fig. 1) and the ratchet wheel 63, shaft 53, key projection 76, and inner hub 23, rotate as a unit with the pulley, causing like rotation of the spool 29 when the adjusting cap 34 is positioned to effect a drive between brake drum 20 and the outer hub 28. During return or rewinding motion of the pulley, the latter is free of the shaft 53 and such motion is effected by the torsional force exerted by unwinding of spring 54, the latter having been wound up when the pull cord 51 was drawn out.

At the initiation of counterclockwise rotation of the pulley (as the parts are viewed in Fig. 1) the pawl is carried counterclockwise relatively to the pawl actuator 67. The latter thereby engages the lower cam face 66 of the pawl causing the pawl to move into engaged relation with ratchet wheel 63 of the clutch assembly, and thereby clutches the pulley 52 to wheel 63, shaft 53, key 76, and inner hub 23 for rotation as a unit.

At the initiation of return or rewinding motion of the pulley 52, the pawl 64 again will move relatively to actuator 67, clockwise with respect thereto, so that the actuator engages the outer cam surface 66 and cams and pawl out of engagement with the teeth of ratchet wheel 63, releasing the pulley from wheel 63 and from the parts which rotate with the latter.

After its camming action upon the pawl, in either direction, the actuating finger 67 is moved with the pawl, the loop portion 68 thereof sliding around stationary annulus 22 in the groove 69.

The pull cord 51 may be alternately drawn out and allowed to return in rapidly repeated sequence, and in such case if the drag upon the line is light, the momentum of the reel may cause it to continuously rotate during such operation of the pull cord. When a fish is being pulled in, the fishing rod will ordinarily be manipulated in coordination with operation of pull cord 51 in order to slacken the line when the spool 32 is being rotated to wind in line.

During a winding-in-line operation the control cap 34 serves as a slip clutch control member, by which the clutching effect between inner hub 23 and outer hub 28 of the spool may be varied. The clutch is preferably so adjusted by cap 34 that it will slip rather than resist motion with a force sufficient to break either pull cord 51 or the fishing line. It will be understood that when line is to be wound-in in this manner, the finger piece 45 may be moved to its forward position (the limit position of clockwise movement as viewed in Fig. 2) so that pawl 49 will prevent unwinding of the line except upon application of such force as will slip the clutch 20, 23, 28.

In order to prevent possible engagement and entanglement of a fishing line, or the like, with the left face of the reel or with the pulley 52, the peripheral portion of pulley flange 50 is turned inwardly as indicated at 81, and the frame 10 has formed thereon a ridge 82 having a sloping outer face 83 whereby fishing line, for example, may slide over the face of the reel without catching on the pulley, the outer portion of the ridge serving as a deflecting surface. It is to be noted that while the flange portion 81 of the pulley is largely within the recess interior of ridge 82, space is provided between the flange and ridge sufficiently wide to permit cord 51 to be wound onto the pulley while the latter is being held stationary. Ridge 82 is discontinued at 84 (see Fig. 1) to provide a channel for cord 51.

The ridge is in substantially the form of a ring whose outer end is open, thereby providing, on the outer face of the frame, an open ended recess within which the major portion of the pulley is disposed. By this arrangement turns of cord 51 may be placed upon or removed from the pulley without varying the tension of spring 54; or, conversely, the spring may be tensioned or untensioned, by rotating the pulley, without changing the number of turns of cord on the pulley, by moving the portion of the cord that is extended from the pulley along the ridge about the axis of the pulley as the latter is rotated.

A guide 85 for the cord is preferably formed on the edge of frame 10, with its surfaces rounded to prevent it from catching or snagging the cord 51, or the fishing line. As shown in Fig. 7, the opening through the guide is lined with an agate sleeve 86, held in place by shoulders 87 and 88. Shoulder 88 may be formed after the agate is in place by a spinning operation wherein material of the guide 85 is worked over the edge of the agate to form the shoulder. The agate sleeve 86 preferably has a hard, glossy surface so as to impose minimum wear upon the pull cord 51, and, of course, will itself be worn only very slowly by frictional engagement of the cord.

As will appear from the drawings and the preceding description, the several parts of my improved fishing reel are of simple design and may be economically manufactured without requiring unusual, complex, or expensive operations.

Likewise, the several parts of the reel are easily accessible for cleaning, being readily disassembled and reassembled. Moreover, the parts are so related that they will not become accidentally detached. In this connection it will be seen that upon removal of cap 34, the spool 29 may be removed, but that all other parts are latched against displacement. Depression of latch 76 to free flange 26 will enable removal of the inner hub part 23, including ratchet wheel 25.

Another depression of latch 76 will enable the assembly of the unit comprising shaft 53, ratchet 63 and cover plate 70, to be removed. The pulley 52 and the ratchet pawl carried thereby may next be removed by releasing several turns of cord 51 from the pulley to relieve the tension of spring 54, and by then turning the pulley (counterclockwise as the parts appear in Fig. 3) to disengage the inner end of spring 54 from the shoulder of notch 59, whereupon the pulley together with its hub 57 may be slid axially off of sleeve 16.

Access to spring 54, seldom required, is effected by removal of the screws, 88, and of plate 15 which the screws hold in place.

Reassembly of the pulley 52 merely requires telescoping of its hub 57 over sleeve 16, and turning of the pulley to cause the shoulder formed by notch 59 in its hub 57 to engage the spring 54 as shown in Fig. 3. The pulley may then be rotated to slightly tension the spring 54 and a few turns of cord 51 wrapped around the pulley to hold the spring tensed. This prevents accidental displacement of the latter from hub 57.

The shaft 53, then inner hub 23, and then the spool 29, are reassembled onto the reel by merely telescoping them into place in the order named. During reassembly of shaft 53, pawl 64 should be raised so not to interfere with ratchet wheel 63. Likewise, during reassembly of inner hub 23, spring 41 should be in the neutral position shown in Fig. 2, so that neither pawl finger, 48 nor 49, will interfere with ratchet wheel 25.

The structure shown in Fig. 7 differs from that shown in the preceding views primarily in that a modified control unit illustrated in Fig. 8 is employed instead of the unit depicted in Fig. 6. Otherwise, the structure differs only in slightly different formations of the inner hub member 23 and the outer or key end of the pivoted lever 72.

As shown in Figs. 7 and 9 the outer end of inner hub member 23 is substantially closed by a web portion 91 having a transverse slot 92 therein, corresponding in function to notch 78 in the device shown in Fig. 5, and constituting a shoulder 93 engaged by a key portion 94 formed on the pivoted lever 72. Another key portion, 95, on lever 72 engages in notch 77 in the end of shaft 53, so that the latter is keyed to the inner hub member.

The control unit shown in Fig. 8, and also in Figs. 7 and 9, includes a cap 96 adapted to be screw-threaded upon the end of inner hub member 23. The cap has a central opening 97 therein, whereby without removing the cap from member 23 the lever 72 may be moved, as described hereinbefore, to enable detachment of the spool 29 (including the inner hub part 23), and, if desired, detachment of shaft 53.

Within a recess 98 in the inner face of the cap is a washer 99 whose outer edge has a groove 101 therearound. A substantially U-shaped spring 102, shown in Fig. 10, has end portions 103 extending through openings 104 in the cap into engagement with the surface of groove 101. The bight portion of the spring is seated in an annular groove 105 about the cap 96.

The spring 102 serves to retain the washer 99 in assembly with the cap, and also frictionally resists rotation of the cap relative to the washer. Since the latter has a key 38 normally engaged in keyway 39 in the inner hub member 23, the cap is frictionally retained against removal from the inner hub member. In its primary function, adjustment of the clutching or braking pressure between the inner hub member and the outer hub member 28, the cap operates in the same manner as cap 34 described in connection with the structure shown in Figs. 1 to 6 inclusive. The washer 99 may be detached from the cap 96 upon removal of the spring 102.

It will be understood that the devices herein shown and described are merely the preferred forms of my invention and illustrative of the inventive principles involved, and that these principles may be otherwise embodied without departing from the spirit of my invention or the scope and range of equivalency to which the appended claims are entitled.

I claim:

1. In a fishing reel, a spool and a supporting frame therefor, said frame having a recess in one face thereof, a pulley mounted substantially coaxially of said spool and having an outer flange with the peripheral portion thereof turned inwardly into said recess, a pull cord wound upon said pulley, said frame having a channel formed in the wall of said recess for passing an extended part of said pull cord, and the peripheral portion of said flange and the adjacent wall of the recess being substantially concentric and spaced to permit winding said pull word upon said pulley.

2. In a fishing reel, a supporting frame, a pulley mounted upon one face of said frame, a ridge on said frame in substantially the form of an open ended ring extending substantially around said pulley for deflecting from the peripheral portion of said pulley a fishing line or like object which may pass over said face of the reel, and a flexible element wound on the pulley, said ridge permitting an extended portion of the flexible element to be moved therealong around the axis of the pulley.

3. In a fishing reel, a supporting frame, a pulley mounted upon one face of said frame, said frame having deflecting surface portions on said face thereof and extending substantially around the pulley for deflecting from the peripheral portion of said pulley a fishing line or the like which may pass over said face, and the outer peripheral face portion of the pulley being uncovered by the frame to permit an extended portion of a flexible element wound on the pulley to move completely around the axis of the latter.

4. In a fishing reel, a supporting frame, a pulley mounted upon one face of said frame, a ridge on said frame in substantially the form of an open ended ring extending substantially around said pulley for deflecting a fishing line or the like from engagement with said pulley, a flexible element wound on the pulley, said ridge having a channel therethrough for passing a portion of the flexible element extended from said pulley, and said ridge permitting an extended portion of the flexible element to be moved therealong around the axis of the pulley.

5. In a fishing reel, a frame and a bearing sleeve supported thereby, a torsion spring extending about said sleeve and having one end thereof secured to said frame, a pulley mounted for rotation upon one end of said sleeve, said pulley having a hub portion detachably connected to the other end of said torsion spring and said pulley being movable axially from said one end of said sleeve upon disconnection from said spring, a shaft journaled in said sleeve, said shaft having a ratchet wheel affixed thereto constituting a shoulder preventing axial displacement of said pulley from said one end of said sleeve, a ratchet pawl carried by said pulley and operatively engaging said ratchet wheel, a spool having relatively rotatable inner and outer hub parts mounted for rotation upon the other end of said sleeve, a cap detachably secured to the outer end of said inner hub part to retain the outer hub part against axial displacement from the inner hub part, and a latch carried by said shaft releasably engageable with said inner hub part holding the latter against displacement from said other end of the sleeve and holding the shaft against axial displacement from said one end of the sleeve.

6. In a fishing reel, a frame and a bearing sleeve supported thereby, a hub rotatable upon the sleeve and having a keyway in the end thereof, a shaft journaled in the sleeve and having a bore therein, a lever within said bore pivoted transversely of the axis of the shaft and having a key part projecting therefrom adjacent the end of the sleeve, and spring means in said bore engaging said lever for releasably maintaining the key part thereof latched in the keyway.

7. In a fishing reel, a frame and a bearing sleeve supported thereby, a hub rotatable upon the sleeve and having a shoulder adjacent the end thereof, a shaft journaled in the sleeve, a member carried by said shaft having a latch projection adjacent the end of the sleeve, resilient means cooperating with said member to urge said projection radially from the axis of said shaft to constitute an abutment against the shoulder of said hub.

8. In a fishing reel, a spool having inner and outer relatively rotatable hub parts with clutch surfaces engageable upon relative axial movement of the parts, and a control means therefor, said inner hub part having a screw threaded end portion with a keyway therein, and said control means comprising a cap screw threaded for engagement with said end portion, a washer extending about said end portion for abutment with a face portion of the outer hub part and having a projection engaging in said keyway for holding it against rotation relative to said inner hub part, means for holding said cap and washer against relative axial displacement, and resilient means effective between said washer and cap to impose frictional resistance to relative rotation of said washer and cap.

9. In a fishing reel, a pair of relatively rotatable parts, one of said parts having a screw threaded end portion, a member screw-threaded to said end portion, a washer upon said end portion between the other one of said parts and said member, resilient means engaging the washer and said member resisting relative turning thereof, means for holding the washer and said member against relative axial displacement, and cooperating means on said one of said parts and the washer for holding them against relative turning.

10. In an adjusting unit for a fishing reel, an internally screw-threaded cap having a recess in one face thereof, a washer in said recess, means holding said washer against axial displacement from said cap and permitting relative turning of said cap and washer, and resilient means interposed between and engaging said cap and washer for resisting relative turning thereof.

11. In a fishing reel, a frame and a bearing sleeve means supported thereby, a spool having a hub part mounted for rotation on one end of said sleeve means, a pulley mounted for rotation on the other end of said sleeve means, a shaft journaled in said sleeve means, means at said one end of the sleeve means for effecting a drive between the pulley and shaft, and means at said other end of the sleeve means for effecting a drive between the shaft and said hub part.

12. In a fishing reel, a frame and a bearing supported thereby, a shaft journaled in said bearing, a spool having a drive connection with said shaft on one side of the bearing, and a pulley having a ratchet drive connection with said shaft on the other side of said bearing.

13. In a fishing reel, a frame and a sleeve supported thereby, a pulley mounted for rotation on said sleeve, a shaft journaled in said sleeve, a ratchet wheel upon said shaft adjacent the end of said sleeve, and a pawl engageable with said ratchet wheel and carried by said pulley.

14. In a fishing reel, a supporting frame, a drive member mounted for rotation relative to the frame, a ratchet wheel co-axial with the drive member and mounted for rotation relative thereto, a pawl carried by the drive member, said pawl having an opening therein with cam faces, a part stationary with the frame, and means frictionally engaging said part and having a portion in said opening for engagement with said cam faces for moving the pawl into or out of engagement with the ratchet wheel upon initiation of rotation of the drive member in one direction or the other direction, respectively, relative to said frame.

15. In a fishing reel, a supporting member, a spool having relatively rotatable inner and outer hub members frictionally engageable upon relative axial motion thereof, said spool being rotatably mounted on said supporting member, a latch adjacent the end of said supporting member and engaged with the inner hub member latching it against axial displacement from the supporting member, and cap means screw-threaded upon the adjacent end of said inner hub member for effecting frictional engagement of the hub members, said cap means having an opening therein providing access to said latch.

16. In an adjusting unit for a fishing reel, an internally screw-threaded cap having a recess in one end face thereof, a washer in said recess having a grooved outer edge, the cap having openings therethrough adjacent said outer edge, and a spring disposed upon said cap, said spring having portions extending through said openings and resiliently engaging the grooved edge of said washer.

17. In a fishing reel, a supporting frame, a pulley mounted upon one face of said frame, said frame having deflecting surface portions thereon for deflecting from engagement with said pulley a fishing line or the like, a cord on said pulley and having a portion extending therefrom, said deflecting surface portions having a recess for passing said portion of the cord, and a guide for said cord carried by the frame in substantial alignment with said recess.

18. In a fishing reel, a spool and a supporting frame therefor, said frame having an open ended recess in one face thereof, the recess opening outwardly, a pulley mounted in said recess and having an outer flange the periphery of which is substantially concentric to and adjacent to the wall of the recess, a pull cord wound on the pulley, and said face of the frame having a channel formed therein for passing an extended part of the pull cord.

19. In a fishing reel, a supporting member having a bearing, a shaft rotatable in the bearing, a spool, friction drive means on one side of the bearing connecting the spool and shaft for rotation together, a drive pulley on the other end of the shaft and ratchet drive means connecting said pulley and said other end of the shaft.

20. In a fishing reel, a frame including a supporting member having a bearing, a shaft extending through said bearing and a spool connected to the shaft on one side of the bearing, ratchet means associated with the spool for opposing unwinding motion thereof relative to the frame, a drive member, and ratchet means on the other side of said bearing connecting the drive member to the shaft to rotate the latter in a direction to wind the spool.

21. In an adjusting cap for a fishing reel, a screw threaded member having a recess in one end face thereof, a washer in said recess, said member having an opening therethrough adjacent said outer edge of the washer, and a spring engaging said member and having a portion extending through said opening and resiliently engaging the washer for resisting rotation thereof relative to the member and preventing displacement of the washer from the recess.

HYLA F. MAYNES.